(12) United States Patent
Hosoda et al.

(10) Patent No.: US 8,072,869 B2
(45) Date of Patent: Dec. 6, 2011

(54) OPTICAL PICKUP HAVING AN ABERRATION CORRECTION FUNCTION

(75) Inventors: Ryozo Hosoda, Osaka (JP); Tetsuya Yoshida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 320 days.

(21) Appl. No.: 12/289,315

(22) Filed: Oct. 24, 2008

(65) Prior Publication Data

US 2009/0109819 A1 Apr. 30, 2009

(30) Foreign Application Priority Data

Oct. 25, 2007 (JP) ................... 2007-277661

(51) Int. Cl.
*G11B 7/135* (2006.01)
*G02B 7/04* (2006.01)

(52) U.S. Cl. .................. 369/112.23; 359/823

(58) Field of Classification Search ............... 720/665
See application file for complete search history.

(56) References Cited

U.S. PATENT DOCUMENTS

| | | | | |
|---|---|---|---|---|
| 6,058,098 | A * | 5/2000 | Kato | 720/663 |
| 7,339,756 | B2 * | 3/2008 | Tengeiji et al. | 359/811 |
| 7,433,137 | B2 * | 10/2008 | Irisawa | 359/819 |
| 7,551,376 | B2 * | 6/2009 | Koyama | 359/823 |
| 7,652,834 | B2 * | 1/2010 | Ishimasa | 359/823 |
| 2005/0219988 | A1 * | 10/2005 | Atarashi et al. | 369/112.08 |
| 2006/0203217 | A1 * | 9/2006 | Nakamura et al. | 355/53 |
| 2008/0198486 | A1 * | 8/2008 | Wakamizu et al. | 359/823 |

FOREIGN PATENT DOCUMENTS

| | | | |
|---|---|---|---|
| JP | 05027149 A | * | 2/1993 |
| JP | 06222254 A | * | 8/1994 |
| JP | 08240758 A | * | 9/1996 |
| JP | 08248284 A | * | 9/1996 |
| JP | 10026717 A | * | 1/1998 |
| JP | 2000206391 A | * | 7/2000 |
| JP | 2002162555 A | * | 6/2002 |
| JP | 2003-045068 A | | 2/2003 |

(Continued)

OTHER PUBLICATIONS

English Machine Translation of JP 2007-101634 (Ishimasa, Lens Drive Device, published on Apr. 19, 2007).*

*Primary Examiner* — Will J Klimowicz
*Assistant Examiner* — Mark Fischer
(74) *Attorney, Agent, or Firm* — Morgan, Lewis & Bockius LLP (57) ABSTRACT

A spherical aberration correction mechanism includes a plurality of aberration correction lenses, a movable portion in which the aberration correction lens is held, a fixed portion in which the movable portion is arranged so as to be slidable as well as the aberration correction lens is held, a shaft supporting the movable portion so as to be rotatable about the axis as well as to be slidable in the axial direction, a feed screw having spiral grooves, an engaging portion having convex portions to be engaged with the spiral grooves from one direction and a coil spring fitted to the outside of the shaft, pressing the movable portion in the axial direction. The coil spring has a rotation prevention portion engaged with the fixed portion and a torque biasing portion engaged with the movable portion, and the coil spring is installed in a twisted state in advance.

26 Claims, 5 Drawing Sheets

FOREIGN PATENT DOCUMENTS

| | | | | |
|---|---|---|---|---|
| JP | 2005315935 A | * | 11/2005 |
| JP | 2006091408 A | * | 4/2006 |
| JP | 2006098652 A | * | 4/2006 |
| JP | 2007-018680 A | | 1/2007 |
| JP | 2007101634 A | * | 4/2007 |
| JP | 2007133262 A | * | 5/2007 |
| JP | 2007199133 A | * | 8/2007 |
| JP | 2007298718 A | * | 11/2007 |

* cited by examiner

OPTICAL PICKUP HAVING AN ABERRATION CORRECTION FUNCTION

This application is based on Japanese Patent Application No. 2007-277661 filed on Oct. 25, 2007, and the contents of which are hereby incorporated by reference.

BACKGROUND OF THE INVENTION

1. Field of the Invention

The present invention relates to an optical pickup including an aberration correction mechanism for correcting spherical aberration.

2. Description of Related Art

In an optical disc device, recording/playback of information is performed by irradiating laser light to an optical disc which is a recording medium by using an optical pickup. On a recording surface of the optical disc, grooves called as tracks are formed, and the optical pickup records or plays back information by allowing laser light to converge and irradiating the light to the tracks as a laser spot or by receiving laser light reflected by the tracks.

Since the width of the track is different in CD (Compact Disc) media and DVD (Digital Versatile Disc) media which have larger recording information capacity than the CD media, a diameter of the laser spot at the time of recording and playback is also different. The laser spot has a circular shape, having characteristics that a diameter thereof is in proportion to a wavelength of laser light and is in inverse proportion to a numerical aperture (NA) of an objective lens.

Infrared laser (wavelength: approximately 780 nm) is used for recording/playback of CD media. In DVD media having larger storage capacity, that is, having higher storage density than CD media, the track width is narrow, therefore, red laser (wavelength: approximately 650 nm) having shorter wavelength than infrared laser is used.

In recent years, BD (Blu-Ray Disc) media having larger recording information capacity than DVD media have appeared on the market. Since BD media has higher recording density and a narrower track width as compared with DVD media, a diameter of the laser spot is required to be small. Accordingly, laser light of blue-violet laser (wavelength: approximately 405 nm) having a shorter wavelength than the laser light for DVD is used for the optical pickup performing recording/playback of BD media. Concerning NA of the objective lens, NA of the objective lens for DVD is approximately 0.6, whereas the objective lens having higher NA, namely, approximately 0.85 is used for BD.

When laser light transmits through the objective lens and when transmitting through a transparent layer of a medium, spherical aberration occurs. The spherical aberration increases in proportion to biquadratic of NA of the objective lens and the thickness dimensions of the transparent layer of the optical disc. As the spherical aberration increases, the spot diameter of the laser spot also increases, as a result, it is difficult to read information recorded in the recording surface. In addition, as the spherical aberration increases, light intensity at the center decreases, as a result, it is difficult to record. A cover layer of the optical disc has a prescribed thickness as a standard, however, the thickness of the cover layer through which the laser light transmits is not even due to errors during manufacture or side-runout, and there is a case that the spherical aberration amount varies according to variation of the thickness of the cover layer and it is difficult to record or read stably.

For example, when comparing the objective lens for DVD (NA=0.6) with the objective lens for BD (NA=0.85), the spherical aberration amount when using objective lens for BD will be quadrupled as compared with the case using the objective lens for DVD. The DVD media only a little affected by the spherical aberration and can perform recording/playback of information, however, the above problem is liable to occur in BD media, which causes trouble in recording/playback of information in many cases. Even when using DVD media, in the case of performing recording/playback of DVD media which have upper-and-lower two layers of recording surfaces, the thickness of the transparent layer through which laser light transmits differs, therefore, recording/playback failures due to the spherical aberration are liable to occur as compared with one-layer DVD media.

Accordingly, a spherical aberration correction mechanism correcting spherical aberration by allowing plural aberration correction lenses to come close to or draw away from each other is used, which is arranged at a previous stage of the objective lens. The spherical aberration correction mechanism includes a movable portion holding at least one of the plural aberration correction lenses, which is slid in an optical axis direction of laser light, a feed screw having spiral grooves formed at an outer periphery, which is arranged in parallel to the optical axis of laser light and an engaging portion connected to the movable portion, which is engaged with the feed screw.

In the spherical aberration correction mechanism, when the feed screw is rotated by an electrical motor, the engaging portion moves straight in a direction along the center axis of the feed screw and the aberration correction lens held by the movable portion is slid in the optical axis direction of laser light to adjust the distance between plural aberration correction lenses properly. The laser light transmits through the plural aberration correction lenses, thereby correcting spherical aberration occurring when the light transmits through the objective lens and when the light transmits through the transparent layer of the optical disc. According to this, the optical pickup can make laser light converge accurately and can focus the accurate laser spot on the tracks formed on the recording surface of the media, as a result, recording/playback of information can be accurately executed.

As a method of driving the aberration correction lens, for example, a method disclosed in JP-A-2003-45068 is proposed. In the optical pickup, a lens holder to which a knife edge (engaging portion) is attached is arranged opposite to the knife edge, sandwiching the center axis of a feed screw, and the knife edge attached to the lens holders is engaged with the feed screw. Then, force is added to the lens holder in the axial direction of the feed screw to suppress the formation of a gap between the knife edge and the feed screw.

According to the above, occurrence of backlash can be suppressed, in which timings of rotation of the feed screw and operation of the knife edge do not match each other when the knife edge is pushed by the rotation of the feed screw. Accordingly, when the feed screw is rotated, the knife edge is also slid without delay, which enables the lens holder to move to a correct position at short time.

Additionally, in the optical pickups disclosed in JP-A-2003-45068 and JP-A-2007-18680, the knife edge and the feed screw are engaged with each other without a gap by pushing the knife edge to the feed screw in the diameter direction of the feed screw using a blade spring.

Also in this case, occurrence of backlash can be suppressed, in which timings of rotation of the feed screw and operation of the knife edge do not match each other when the knife edge is pushed by the rotation of the feed screw. Accordingly, when the feed screw is rotated, the knife edge is also slid without delay, which enables the lens holder to move to a correct position at short time.

Furthermore, there exist a technique in which the knife edge itself is formed to be a shape which can demonstrate elastic force, and the knife edge is pushed to the feed screw.

However, in the case that the lens holder has a shape of sandwiching the feed holder, when the lens holder is fixed due to unusual situations such as the movable range is exceeded or a foreign substance is caught, large force acts on both members due to engagement of the knife edge and the feed screw, which may deform and damage the knife edge or the feed screw. In addition, when power continues to be supplied to a motor for driving the feed screw in a state in which the engagement between the knife edge and the feed screw is not disengaged, the load of the motor is increased and the motor is heated, which may fail the motor itself or deform or damage peripheral members.

The blade spring adjusts elastic force by the deflection amount, and when the length of the blade spring is not sufficient, large elastic force is brought out by the small deflection amount. In the aberration correction mechanism, there is not sufficient space in a place where the blade spring is installed and the knife edge is pushed to the feed screw with a short blade spring in many cases. In such cases, the elastic force of the blade spring becomes too large, as a result, friction between the knife edge and the feed screw increases. Accordingly, abrasion of the knife edge and (or) the feed screw occurs in an early stage. In addition, the load of the motor increases or step-out of the motor occurs, therefore, it is necessary to increase the performance of the motor or to use the motor in a low-frequency range, which may lead to the increase of costs or accuracy deterioration of aberration correction.

When the knife edge is formed so that the knife edge itself demonstrates elastic force, the shape becomes complicated, which may decrease reliability such as the strength and the shape of the knife edge itself. In order to manufacture the optical pickup so as to have sufficient reliability, the high accuracy is required for the process, which leads to the increase of costs for manufacture.

SUMMARY OF THE INVENTION

Accordingly, an object of the invention is to provide an optical pickup which is capable of improving positioning accuracy of aberration correction lens for correcting spherical aberration as well as suppressing occurrence of trouble such as damages or breakdowns of a drive mechanism of the aberration correction lens in case of an emergency without using a special member.

An optical pickup according to an embodiment of the invention is capable of correcting spherical aberration, including an objective lens condensing light beams emitted from a light source to a recording surface of an information recording medium, a plurality of aberration correction lenses correcting spherical aberration of laser light condensed to the recording surface by the objective lens, a movable portion in which at least one lens of the plural aberration correction lenses is held, a fixed portion in which the movable portion is arranged so as to be slidable as well as the aberration correction lens which is not held by the movable portion is held, a shaft arranged at the fixed portion in parallel to an optical axis of the aberration correction lens, supporting the movable portion so as to be rotatable about the axis as well as to be slidable in the axial direction, a feed screw stretched in parallel to optical axes of the plural aberration correction lenses, having spiral grooves, an engaging portion provided at the movable portion, having convex portions to be engaged with the spiral grooves of the feed screw from one direction and a coil spring fitted to the outside of the shaft, pressing the movable portion in the axial direction. One end portion of the coil spring includes a rotation prevention portion engaged with the fixed portion for preventing rotation. The other end portion of the coil spring includes a torque biasing portion engaged with the movable portion for biasing force rotating the engaging portion in the side of feed screw about the shaft. The coil spring is installed in a twisted state in advance.

According to a preferred embodiment of the invention, the movable portion rotates about the shaft to thereby expose convex portions of the engaging portion engaged with the spiral grooves from the spiral grooves completely.

According to a preferred embodiment of the invention, the rotation prevention portion of the coil spring is formed by stretching a tip portion of the coil spring in a tangential direction of coil winding, including an engaging rib engaged with the rotation prevention unit at the fixed portion.

According to a preferred embodiment of the invention, the torque biasing portion of the coil spring is formed by stretching a tip portion of the coil spring in the axial direction of the coil, including an engaging concave portion with which the torque biasing portion is engaged at the movable portion.

According to a preferred embodiment of the invention, the lens held by the movable portion is an aberration correction collimator lens, or an aberration correction expand lens.

According to a preferred embodiment of the invention, teeth made of a material having a smaller friction coefficient than the engaging portion, including convex portions to be engaged with the spiral grooves are fixed at a surface facing the feed screw at the engaging portion.

DESCRIPTION OF THE PREFERRED EMBODIMENTS

Figure 1:
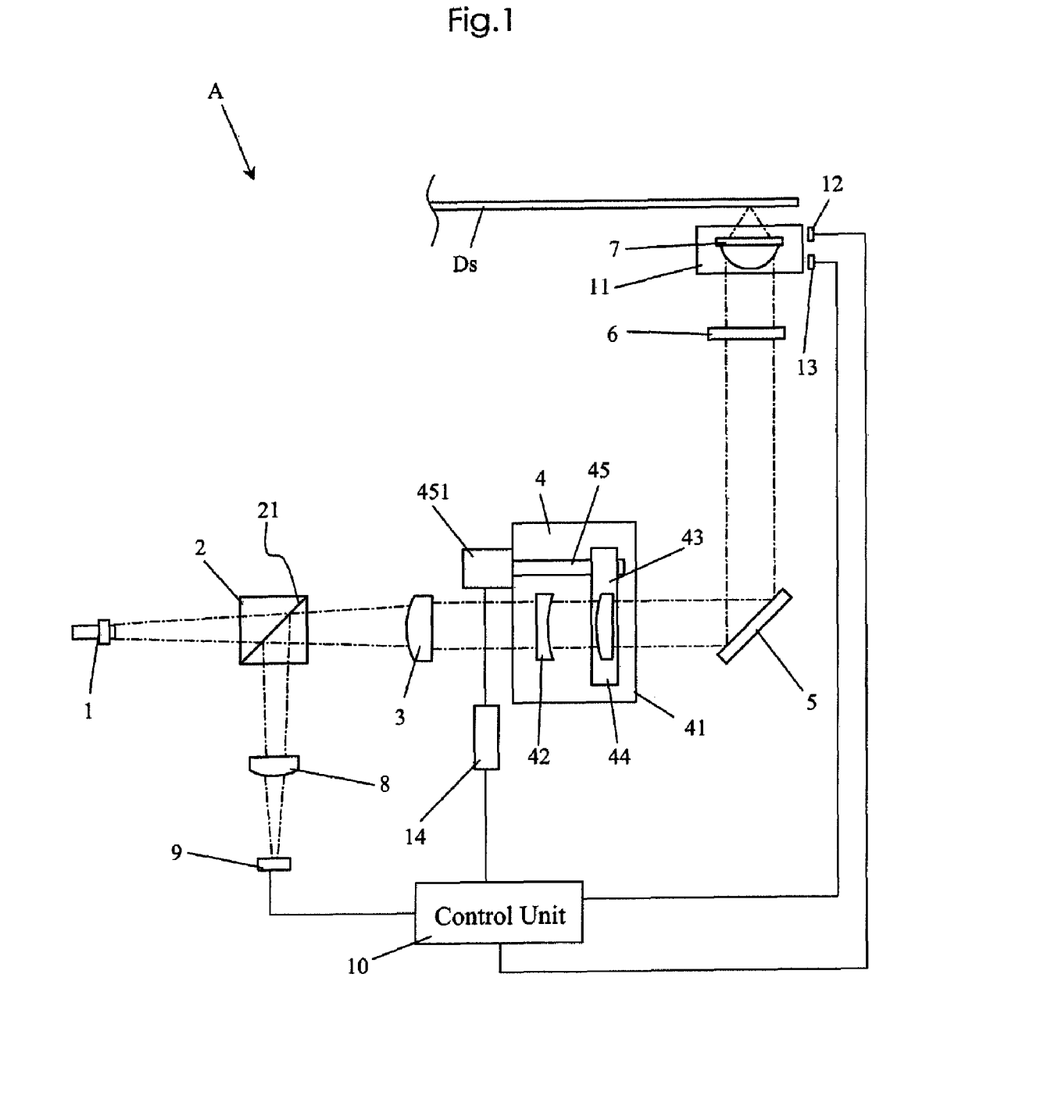
FIG. 1 is a configuration diagram of an optical system of an optical pickup according to the invention.

Hereinafter, embodiments of the invention will be explained with reference to the drawings. FIG. 1 is a configuration diagram of an optical system of an optical pickup according to the invention. The optical pickup shown in FIG. 1 is an optical pickup for BD performing recording or playback of information by using blue-violet laser.

An optical pickup "A" shown in FIG. 1 at least includes a laser light source 1, a polarizing beam splitter 2, a collimator lens 3, a spherical aberration correction mechanism 4, a rising mirror 5, a quarter-wave length plate 6, an objective lens 7, a sensor lens 8 and an optical detector 9.

The laser light source 1 is a semiconductor laser light source emitting blue-violet laser light having a wavelength 405 nm in this case, though not limited. The laser light emitted from the laser light source 1 is a point light source and the laser light emitted from the laser light source 1 is a diverging light.

The polarizing beam splitter 2 includes a reflective surface 21, which can allow laser light to transmit or reflect according to polarization direction of incident laser light. The collimator lens 3 is a lens for converting diverging light into parallel light and for converting parallel light into converging light.

The details of the spherical aberration correction mechanism 4 will be described later, which corrects the spherical aberration of laser light when transmitting through the spherical aberration correction mechanism 4. The rising mirror 5 reflects laser light and turns the traveling direction of laser light by 90 degrees. The rising mirror 5 is arranged so that the optical axis of laser light is at right angles to a recording surface of an optical disc Ds by the reflection by the rising mirror 5.

The quarter-wave length plate 6 is an optical member for converting linear polarization into circular polarization of transmitting laser light as well as converting circular polarization into linear polarization. The optical lens 7 is a lens for condensing laser light. The laser light is condensed when transmitting through the objective lens 7, forming a beam spot on the recording surface of the optical disc Ds. The beam spot is irradiated to the tracks formed on the recording surface of the optical disc Ds. The laser light is reflected on the recording surface of the optical disc Ds. The objective lens 7 is a lens having the numerical aperture (NA) of 0.85, though not limited to this.

The sensor lens 8 is a lens giving astigmatism to the incident laser light, which is used for focus correction and the like. As the sensor lens 8, for example, a columnar lens having an elliptical cross-section can be cited. The optical detector 9 has a sensor which can measure the intensity of the incident laser light. As the sensor of the optical detector 9, the one in which a photoelectric element is used can be cited.

The spherical aberration of the objective lens 7 is in proportion to biquadratic of NA and in proportion to the thickness of the cover layer which is the transparent layer of the optical disc. The objective lens 7 has the extremely high NA which is 0.85, therefore, the spherical aberration is apt to occur. When the spherical aberration occurs, the spot becomes unclear and the spot diameter becomes large as well as the light intensity at the center is reduced. When the spot diameter becomes large, it is difficult to read information recorded in the recording surface. In addition, when the light intensity at the center is reduced, it is difficult to record, and when the light intensity is increased, an area in which the light intensity is high becomes large, therefore, it is difficult to record information in a small area (tracks).

The cover layer of the optical disc Ds has a prescribed thickness as a standard, however, the thickness of the cover layer through which laser light transmits is not fixed due to errors during manufacture or side-runout. Accordingly, the spherical aberration correction mechanism 4 is provided for previously correcting the spherical aberration of laser light incident to the objective lens 7 and for reducing the effect of the spherical aberration of the laser spot formed on the recording surface. The spherical aberration correction mechanism 4 is capable of correcting the spherical aberration amount of laser light within a prescribed range.

Figure 2:
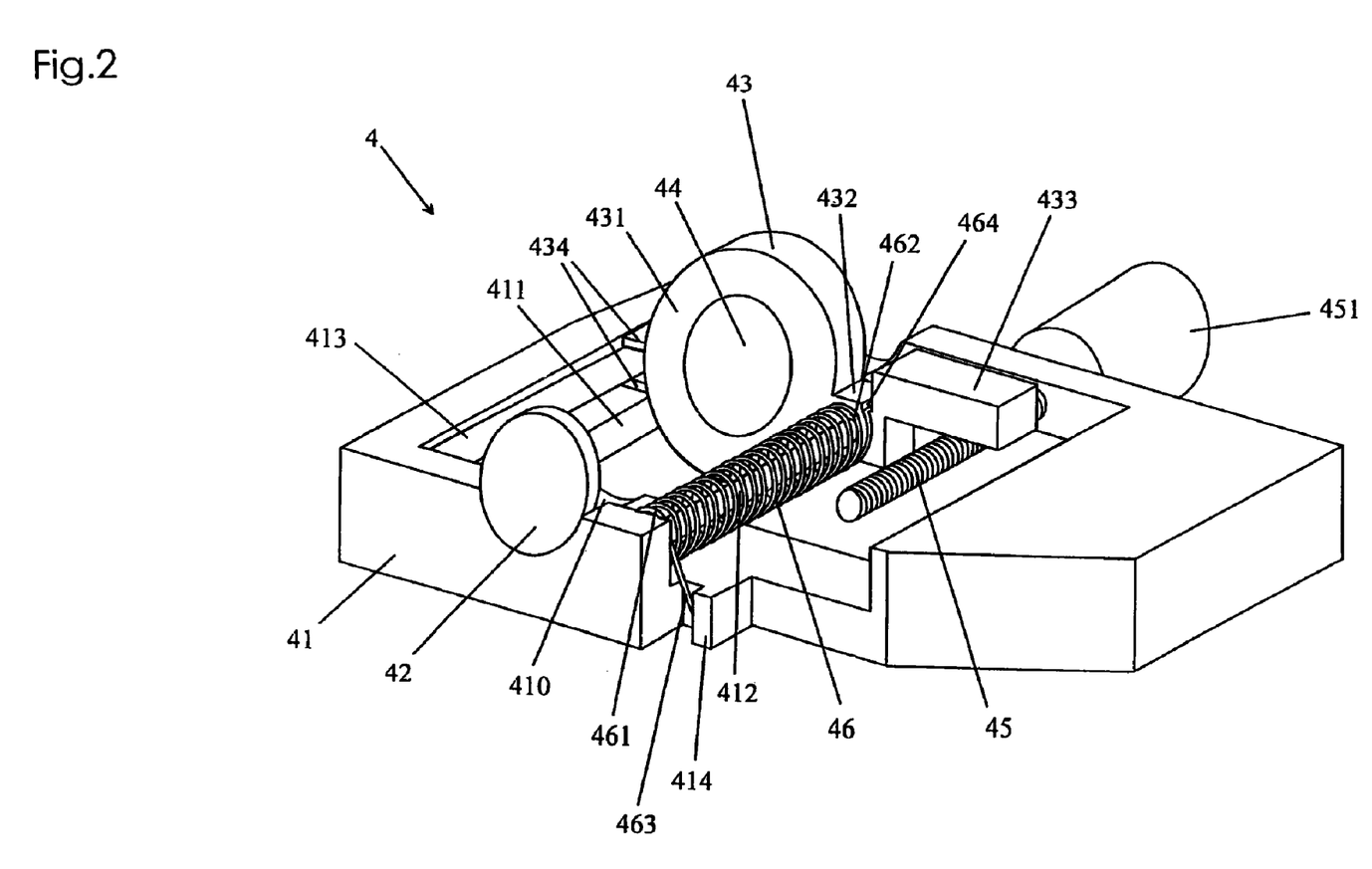
FIG. 2 is a perspective view of a spherical aberration correction mechanism provided in the optical pickup according to the invention.
Figure 3:
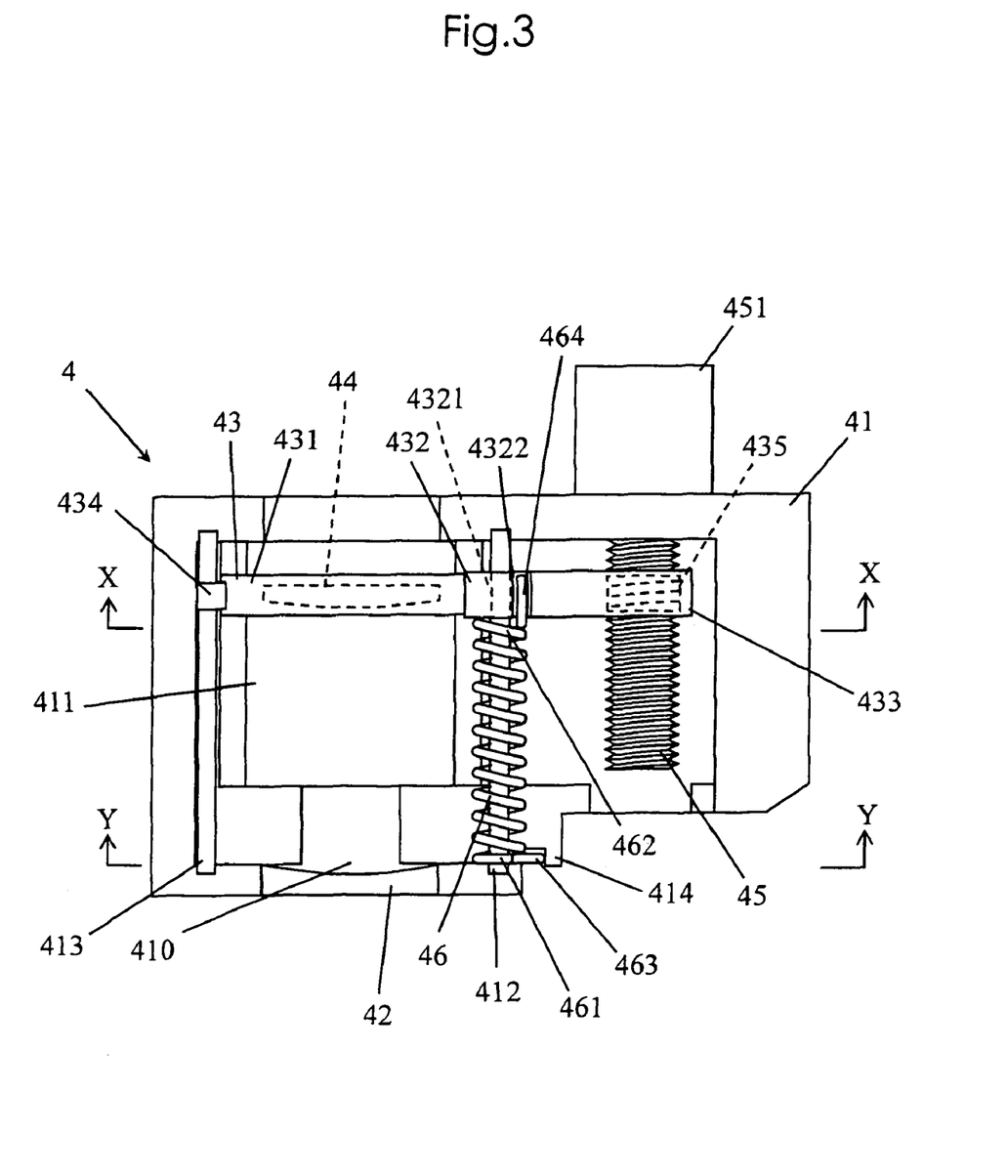
FIG. 3 is a plan view of the spherical aberration correction mechanism shown in FIG. 2.
Figure 4:
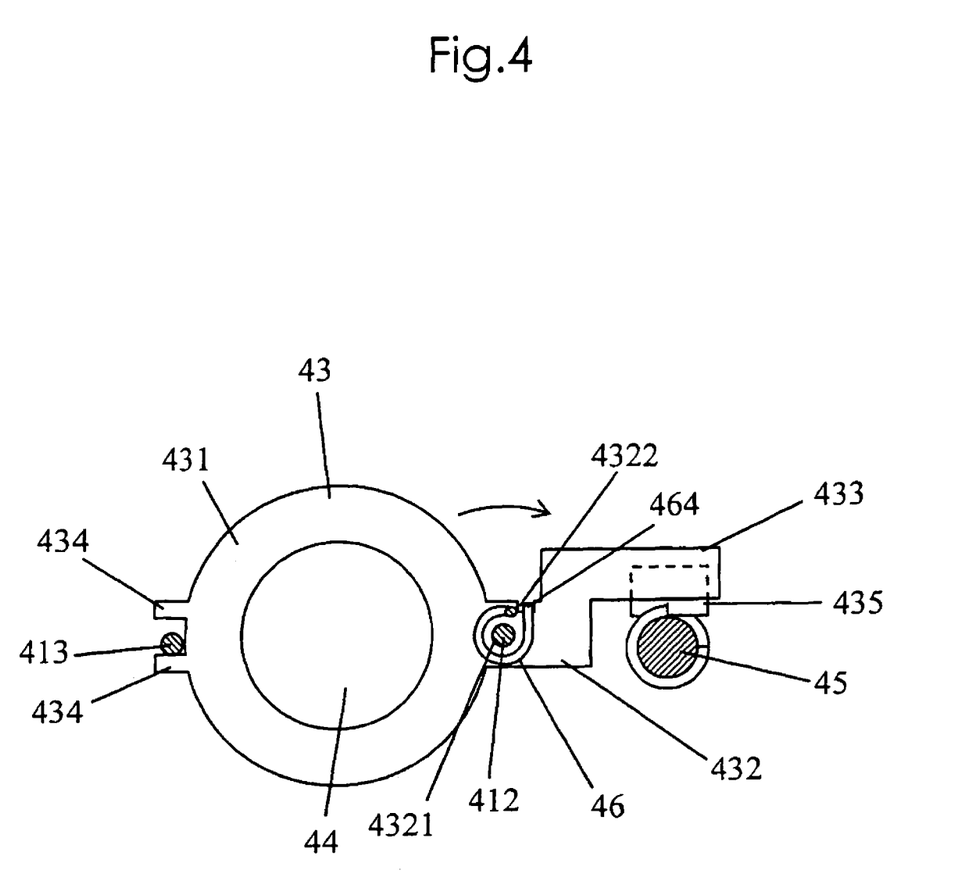
FIG. 4 is a cross-sectional view of the spherical aberration correction mechanism shown in FIG. 3 taken along X-X line.
Figure 5:
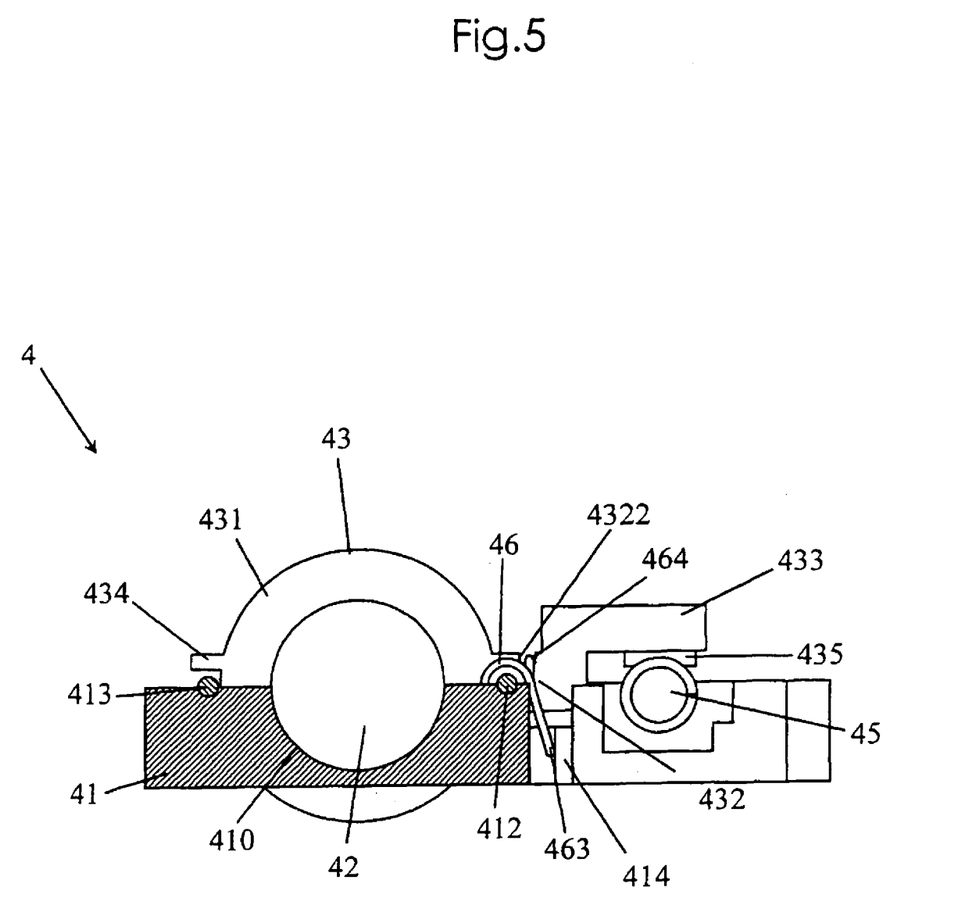
FIG. 5 is a cross-sectional view of the spherical aberration correction mechanism shown in FIG. 3 taken along Y-Y line.

The spherical aberration correction mechanism 4 will be explained in detail as follows. FIG. 2 is a perspective view of the spherical aberration correction mechanism provided in the optical pickup according to the invention, FIG. 3 is a plan view of the spherical aberration correction mechanism shown in FIG. 2, FIG. 4 is a cross-sectional view of the spherical aberration correction mechanism shown in FIG. 3 taken along X-X line, and FIG. 5 is a cross-sectional view of the spherical aberration correction mechanism shown in FIG. 3 taken along Y-Y line. For convenience, a fixed portion and a driving motor are not drawn in FIG. 4.

As shown in FIG. 2 and FIG. 3, the spherical aberration correction mechanism 4 includes a fixed portion 41, an aberration correction expand lens 42, a movable portion 43, an aberration correction collimator lens 44, a feed screw 45 and a coil spring 46. The spherical aberration correction mechanism 4 corrects the spherical aberration by allowing laser light to transmit through the aberration correction expand lens 42 and the aberration correction collimator lens 44 which are apart from each other by a predetermined distance according to the aberration correction amount. The laser light transmits through the aberration correction expand lens 42, then, transmits through the aberration correction collimator lens 44.

The fixed portion 41 is a frame manufactured by molding resin. The fixed portion 41 is fixed to a not-shown base member of the optical pickup. In the fixed portion 41, a laser light path 410 through which laser light which has been transmitted through the polarizing beam splitter 2 transmits. The aberration correction expand lens 42 is fixed in the laser light path 410. The aberration correction expand lens 42 allows laser light to transmit through the center thereof and is fixed to the fixed portion 41 so that the center axis thereof is in parallel to the optical axis of the laser light. Further, a lens sliding portion 411 which is adjacent to the laser light path 410 of the fixed portion 41 and is a semi-columnar concave groove having a curvature radius larger than the laser light path 410 is formed. A later-described lens holding portion 431 of the movable portion 43 is arranged at the lens sliding portion 411 so as to be slidable.

The feed screw 45 in which spiral grooves having screw-threads shape are formed at an outer peripheral surface is arranged at the fixed portion 41. The feed screw 45 is parallel to the optical axis of laser light transmitting through the laser light path 410 and is supported by the fixed portion 41 so as to be rotated. A driving motor 451 is connected to the feed screw 45, and the feed screw 45 can be rotated by driving the driving motor 451. The driving motor 451 may be directly connected to the feed screw 45 or may be connected thereto through a transmission mechanism such as a gear mechanism. In this case, the driving motor 451 is connected to one end portion of the feed screw 45 and the body of the driving motor 451 is fixed to the fixed portion 41. As the driving motor 451, a stepping motor is applied here, though motors which can be driven by electric power can be applied on a broad range. The stepping motor is applied as the driving motor 451, thereby controlling the rotation angle (rotation speed) of the feed screw 45 accurately.

The fixed portion 41 includes a center shaft 412 and a side shaft 413 having a columnar shape formed sandwiching the laser light path 410. The center shaft 412 and the side shaft 413 are arranged so as to be parallel to the optical axis of laser light transmitting through the laser light path 410. The center shaft 412 is arranged between the laser light path 410 and the feed screw 45.

The movable portion 43 includes the lens holding portion 431 in which the aberration correction collimator lens 44 is held, a sliding portion 432 engaged with the center shaft 412 so as to be slidable and an engaging portion 433 arranged so as to touch the feed screw 45. In addition, the coil spring 46 is fitted to the outside of the center shaft 412 as shown in FIG. 2. The coil spring 46 can be stretched in the axial direction of the center shaft 412.

As shown in FIG. 4 and FIG. 5, the lens holding portion 431 and the engaging portion 433 are integrally formed so as to sandwich the sliding portion 432. The movable portion 43 is manufactured by being integrally molded with resin having an excellent molding property and high resistance to environmental changes such as heat, for example, liquid crystal polymer, PPS (Polyphenylenesulfide) and the like.

A fitting portion 434 which is freely fitted to the side shaft 413 of the fixed portion 41 so as to be slidable is formed at the opposite side of the sliding portion 432 of the lens holding portion 431. In the fitting portion 434, two protrusions are formed in parallel, and the side shaft 413 is arranged between the two protrusions. A gap between the two protrusions in the fitting portion 434 is formed to be larger than the outer diameter of the side shaft 413.

At the sliding portion 432, a sliding hole 4321 into which the center shaft 412 is inserted is formed. Further, an engaging concave portion 4322 with which a part of the coil spring 46 is engaged is formed. The engaging concave portion 4322 is a concave groove formed at a portion outside the sliding portion 432 (an upper surface side in the example), which is stretched in the direction of the center axis of the sliding hole 4321.

The engaging portion 433 has a concave hole at a surface facing the feed screw 45, and teeth 435 having plural convex portions to be engaged with the feed screw 45 are provided at the concave hole (refer to FIG. 4 and the like). The teeth 435 are members formed by integral molding of resin. The teeth 435 are fixed by being pressed into the concave hole formed at the surface of the engaging portion 433 which faces the feed screw 45. The teeth 435 may be fixed by using an adhesive member such as an adhesive or an adhesive tape. It is preferable that the teeth 435 are made of resin having high slidability because they are in sliding contact with the feed screw 45. As materials having high slidability, for example, a DURACON (brand name, manufactured by Polyplastics Co. Ltd.) resin, a polyacetal resin and the like can be cited.

When the driving motor 451 is driven in a state in which convex portions of teeth 435 and spiral grooves of the feed screw 45 are engaged, the feed screw 45 is rotated and the teeth 435 slide in the axial direction of the feed screw 45 by the rotation of the feed screw 45. Accordingly, the engaging portion 433 to which the teeth 435 are attached and the whole movable portion 43 with which the engaging portion 433 is integrally formed are slid in the axial direction of the center shaft 412 (the side shaft 413).

The movable portion 43 is slid in the axial direction of the center shaft 412 and the side shaft 413, as a result, the aberration correction collimator lens 44 held by the lens holding portion 431 is slid in the direction of the optical axis of laser light. Accordingly, the aberration correction collimator lens 44 comes close to or draws away from the aberration correction expand lens 42 along the optical axis of laser light.

The coil spring 46 is a spring formed spirally with wire materials (for example, metal wire) which can be elastically deformed. In the coil spring 46, a first end portion 461 abuts on the fixed portion 41, and a second end portion 462 abuts on the sliding portion 432 of the movable portion 43. The first end portion 461 also has a rotation prevention portion 463 formed so that the end portion is stretched in the tangential direction. The second end portion 462 is provided with a torque biasing portion 464 formed so that the end portion of the metal wire is stretched in the axial direction. The torque biasing portion 464 is engaged with the engaging concave portion 4322 formed at the sliding portion 432 of the movable portion 43. In addition, a spring fastening rib 414 for suppressing rotation of the coil spring 46 is formed at the fixed portion 41, with which the rotation prevention portion 463 is engaged. As the rotation prevention, portion 463, the one formed by stretching the end portion of the coil portion 46 is stretched in the tangential direction is cited, however, it may be the one having a shape which can prevent the rotation of the coil spring 46, for example, a shape of stretching in the axial direction in the same manner as the torque biasing portion 464 may be applied. It is also preferable that the engaging hole stretching (which may pierce through) in the axial direction of the sliding portion 432 is used instead of the engaging concave portion 4322 and the torque biasing portion 464 is inserted into the engaging hole.

The convex portions of the teeth 435 are formed to be smaller than the spiral grooves so as to be easily engaged with the spiral grooves of the feed screw 45. Since the convex portions of the teeth 435 are formed small, minute displacement (hereinafter, referred to as backlash) in the axial direction of the movable portion 43 occurs. When the backlash occurs, timings of driving the feed screw 45 and sliding of the teeth 435 in the axial direction do not match each other. Accordingly, the coil spring 46 biases the movable portion 43 in the axial direction of the center shaft 412 by the reacting force thereof and pushes the convex portions of the teeth 435 to the spiral grooves of the feed screw 45 to prevent the backlash.

Additionally, the coil spring 46 is fitted to the outside of the center shaft 412 in a twisted state, in other words, in a state in which torque is added in the twisting direction. The coil spring 46 is installed so that the rotation prevention portion 463 is held by the spring fastening rib 414, and the torque biasing portion 464 pushes the engaging concave portion 4322. The coil spring 46 is installed in this manner, thereby biasing the movable portion 43 so that the teeth 435 are pushed to the feed screw 45, taking the sliding hole 4321 as the center. At this time, the fitting portion 434 touches the side shaft 413 which suppresses the convex portions of the teeth 435 to abut on the feed screw 45 too strongly.

Since the movable portion 43 is rotated about the center shaft 412 slightly, the aberration correction collimator lens 44 is rotated at the same time. Accordingly, it is preferable that the lens holding portion 431 is formed so that laser light transmits through the center of the aberration correction collimator lens 44 in a state in which the fitting portion 434 touches the side shaft 413. The fitting portion 434 is formed so that the convex portions of the teeth 435 completely protrude from (jump) the spiral grooves of the feed screw 45 when the movable portion 43 is rotated in the opposite direction to the biasing direction.

As described above, the coil spring 46 adjusts pushing force of the teeth 435 to the feed screw 45 by adjusting the twist amount at the time of installing the coil spring 46. The adjustment of the twist amount of the coil spring 46 can be performed easily, therefore, the pushing force of the teeth 435 to the feed screw 45 can be adjusted easily.

It is possible to suppress the convex portions of the teeth 435 to protrude from (jump) the spiral grooves of the feed screw 45 by adjusting pushing force of the teeth 435 to the feed screw 45 at the time of normal operation, which enables the movable portion 43 to slide accurately and stably along with the function of preventing the backlash. For example, when the distance between the aberration correction expand lens 42 and the aberration correction collimator lens 44 is controlled by the rotation speed (rotation angle) of the driving motor 451, it is possible to suppress the teeth 435 to jump, to suppress the relation with respect to the distance between the aberration correction expand lens 42 and the aberration correction collimator lens 44 to be displaced and to suppress the spherical aberration correction accuracy to deteriorate.

Additionally, when emergency situations occur in the spherical aberration correction mechanism 4, it is possible to suppress the convex portions of the teeth 435 to protrude from (jump) the spiral grooves of the feed screw 45 and suppress the movable portion 43 to slide. Accordingly, it is possible to suppress the damage to respective portions of the movable portion 43, the aberration correction collimator lens 44 and the teeth 435, and to suppress the trouble to occur at the driving motor 451 due to the excessive load.

As emergency situations, for example, a case in which the driving motor 451 generates large torque suddenly and rotates at high speed, as a result, it is difficult that the convex portions of the teeth 435 follow the rotation of the spiral grooves of the feed screw 45, a case in which a foreign substance is mixed into the spherical aberration correction mechanism 4, the sliding of the movable portion 43 is interrupted and the movable portion 43 moves, exceeding a movable range (a case in which the driving motor 451 is further driven in a state in which the lens holding portion 431 touches the end portion in the axial direction of the lens sliding portion 411) and the like can be cited.

Hereinafter, a procedure of reading information recorded in an optical disc by using the optical pickup will be explained. First, laser light emitted from the laser light source 1 is incident to the polarizing beam splitter 2. The laser light emitted from the laser light source 1 is linear polarization light, and the polarization direction thereof is the direction in which light transmits through the reflective surface of the polarizing beam splitter 2. Therefore, the laser light transmits through the reflective surface 21 of the polarizing beam splitter 2. The laser light transmitted through the polarizing beam splitter 2 transmits through the collimator lens 3 to be converted from diverging light into parallel light.

The laser light transmitted through the collimator lens 3 transmits through the spherical aberration correction mechanism 4. At this time, the laser light is corrected so that the aberration thereof becomes the aberration in accordance with the thickness of the transparent layer of the optical disc. The traveling direction of the laser light transmitted through the spherical aberration correction mechanism 4 is turned by 90 degrees by the rising mirror 5, so that the optical axis becomes at right angles with respect to the recording surface of the optical disc Ds. The laser light enters the quarter-wave length plate 6. The laser light entering the quarter-wave length plate 6 is linear polarization light whose polarization direction is fixed and transmits through the quarter-wave length plate 6 to be converted into circular polarization.

The laser light transmitted through the quarter-wave length plate 6 is condensed when transmitting through the objective lens 7 to form a laser spot on the recording surface of the optical disc Ds. The laser spot is formed by condensing light so that laser light has a circular shape having a diameter of almost the same size as the width of tracks formed on the recording surface of the optical disc Ds. The laser light irradiated on the recording surface of the optical disc Ds as the laser spot is reflected on the recording surface. When the laser light is reflected on the recording surface, the phase thereof shifts by half wavelength.

The laser light reflected on the recording surface of the optical disc Ds is converted into parallel light when transmitting through the optical lens 7 and converted from the circular polarization into linear polarization when transmitting through the quarter-wave length plate 6. At this time, the polarization direction of laser light transmitted through the quarter-wave length plate 6 is the direction orthogonal to laser light emitted from the laser light source 1 and transmitted through the polarizing beam splitter 2. For example, if the laser light transmitted through the polarizing beam splitter 2 has a polarization direction which is parallel with respect to space, the laser light reflected on the optical disc Ds has a polarization direction which is orthogonal with respect to space.

The laser light transmitted through the quarter-wave length plate 6 transmits through the aberration correction mechanism 4 and transmits through the collimator lens 3. The laser light which was parallel light is converted into converging light by being transmitted through the collimator lens 3 to enter the polarizing beam splitter 2. Since the polarization direction of laser light is orthogonal to the polarization direction of laser light transmitted through the polarizing beam splitter 2, the laser light reflected on the optical disc Ds is reflected on the reflective surface 21 of the polarizing beam splitter 2, and the traveling direction thereof is turned by 90 degrees to enter the sensor lens 8. The astigmatism is given to the laser light when transmitting through the sensor lens 8, and the laser light is irradiated to the optical detector 9. The optical detector 9 generates an electric signal (for example, a focus error signal, a tracking error signal, or an information playback signal) based on the incident laser light.

The electric signal generated in the optical detector 9 is transmitted to the control unit 10. The control unit 10 outputs a drive signal for moving the lens holder 11 which holds the objective lens in a tracking direction (direction which is parallel to the recording surface of the optical disc and orthogonal to the tracks) or a focusing direction (direction vertical to the recording surface of the optical disc) to a tracking coil 12 and a focusing coil 13 included in the lens holder 11 based on the transmitted electric signal. The control unit 10 also outputs a correction mechanism drive signal for driving the spherical aberration correction mechanism 4 based on the electric signal.

The driving motor 451 of the spherical aberration correction mechanism 4 is driven based on the correction mechanism drive signal from the control unit 10. At this time, a driver circuit for motor drive 14 is provided between the driving motor 451 and the control unit 10, and the driver circuit for motor drive 14 inputs power to the driving motor 451 in accordance with the correction mechanism drive signal.

As described above, one coil spring 46 doubles as the axial direction biasing member for suppressing backlash of the teeth 435 and the torque biasing member for pushing the teeth 435 to the feed screw 45, therefore, installation space can be reduced as compared with the case of providing respective members separately, which enables the spherical aberration correction mechanism 4 to be downsized. In addition, since both functions of preventing backlash and preventing jumping are included, the spherical aberration correction can be performed rapidly and with high accuracy.

Since the coil spring 46 is more compact than a blade spring, it is possible to adjust spring force easily by adjusting the winding number, pitch and a diameter of wire material. The spherical aberration correction mechanism 4 uses the coil spring 46 as the torque biasing member, and the adjustment of pushing force to the movable portion 43 can be easily performed. Accordingly, the pushing force of the teeth 435 to the feed screw 45 can be formed so that the convex portions of the teeth 435 do not jump the spiral grooves of the feed screw 45 at the time of normal operation and so that the convex portions jump at the time of emergency.

According to the above, the driving motor 451 can be driven without excessive load, therefore, it is possible to suppress occurrence of step-out even at the time of driving the driving motor 451 in a high-frequency range. Even when the driving motor 451 continues rotating in a state in which the movable portion 43 is not able to move due to interfusion of foreign substances or control errors, the teeth 435 is biased so as to jump when force having more than the prescribed degree acts thereon, therefore, it is possible to suppress the damage of the teeth 435 or the feed screw 45 and the failure of the driving motor 451 due to excessive load.

Furthermore, even in the case of restart after the emergency stop with the jump of the teeth 435 due to occurrence of emergency, the teeth 435 is biased toward the feed screw 45, therefore, it is possible that the convex portions of the teeth 435 are engaged with the spiral grooves of the feed screw 45 due to the biased force and the mechanism automatically returns to the normal state.

In the above embodiment, the example in which the teeth 435 are formed separately from the engaging portion 433 has been illustrated, however, they may be formed integrally. However, it is preferable that the teeth 435 are manufactured by using materials (resins) with less friction and that the movable portion 43 (engaging portion 433) is manufactured by using materials (resins) having mechanical strength. It is advantageous on costs that they are manufactured by using different materials (resins) respectively.

In the embodiment, the example used for the optical pickup which is used for the optical disc device performing recording or playback of information by using blue (blue-violet) laser has been explained, however, it is not limited to this. For example, the invention can be applied to the optical pickup one in which recording/playback of information is performed by irradiating laser light to a two-layer optical disc by using red laser, or the one in which recording/playback of information is performed with respect to plural types of optical discs (for example, BD media, DVD media and CD media) by using blue laser, red laser or infrared laser.

In the above spherical aberration correction mechanism 4, the aberration correction collimator lens 44 is slid by being held by the movable portion 43, however, it is also preferable that the aberration correction expand lens 42 is slid. Also, in the spherical aberration correction mechanism 4, the example in which a piece of aberration correction expand lens 42 and a piece of aberration correction collimator lens 44 are provided has been cited, however, it is also preferable that aberration is corrected by using further more lenses. In that case, a function of correcting aberration other than spherical aberration may be included. The spherical aberration correction mechanism may be provided with one of a correction collimator lens and an aberration correction expand lens, with this lens held by the movable portion.

In the above optical pickup "A", the spherical aberration correction mechanism 4 is provided between the collimator lens 3 and the rising mirror 5, however, it is not limited to this. The arrangements whereby irradiation accuracy of laser light does not deteriorate can be widely applied.

As described above, the embodiment of the invention has been specifically explained, however, the invention is not limited to the above embodiment and can be variously modified in a range not departing from the gist of the invention.

The invention can be applied to an optical pickup in which spherical aberration correction is necessary.

What is claimed is:
1. An optical pickup which is capable of correcting spherical aberration, comprising:
  an objective lens condensing light beams emitted from a light source to a recording surface of an information recording medium;
  a plurality of aberration correction lenses correcting spherical aberration of laser light condensed to the recording surface by the objective lens;
  a movable portion in which at least one lens of the plural aberration correction lenses is held;
  a fixed portion in which the movable portion is arranged so as to be slidable and in which the aberration correction lens which is not held by the movable portion is held;
  a shaft arranged at the fixed portion in parallel to an optical axis of the light beams, supporting the movable portion so as to be rotatable about an axis of the shaft as well as to be slidable in a direction of the axis of the shaft;
  a feed screw arranged in parallel to optical axes of the plural aberration correction lenses, having spiral grooves;
  an engaging portion provided at the movable portion, having convex portions to be engaged with the spiral grooves of the feed screw from one direction; and
  a coil spring fitted to the outside of the shaft, pressing the movable portion in the direction of the axial of the shaft, and
    wherein one end portion of the coil spring includes a rotation prevention portion engaged with the fixed portion for preventing rotation,
    the other end portion of the coil spring includes a torque biasing portion engaged with the movable portion for biasing force rotating the engaging portion in the side of the feed screw about the shaft,
    the coil spring is installed in a twisted state in advance, and
    the convex portions serve as teeth, and on an occasion of failure, the teeth come off the spiral grooves of the feed screw, thereby preventing breakage.

2. The optical pickup according to claim 1, wherein the movable portion rotates about the shaft to thereby expose the convex portions of the engaging portion engaged with the spiral grooves from the spiral grooves completely.

3. The optical pickup according to claim 2, wherein the rotation prevention portion of the coil spring is formed by stretching a tip portion of the coil spring in a tangential direction of coil winding, and is engaged with an engaging rib at the fixed portion.

4. The optical pickup according to claim 3, wherein the torque biasing portion of the coil spring is formed by stretching a tip portion of the coil spring in an axial direction of the coil, and is engaged with an engaging concave portion at the movable portion.

5. The optical pickup according to claim 4, wherein the lens held by the movable portion is an aberration correction collimator lens.

6. The optical pickup according to claim 5, wherein the teeth made of a material having a smaller friction coefficient than the engaging portion, to be engaged with the spiral grooves are fixed at a surface facing the feed screw at the engaging portion.

7. The optical pickup according to claim 4, wherein the lens held by the movable portion is an aberration correction expand lens.

8. The optical pickup according to claim 7, wherein the teeth made of a material having a smaller friction coefficient than the engaging portion, to be engaged with the spiral grooves are fixed at a surface facing the feed screw at the engaging portion.

9. The optical pickup according to claim 1, wherein the rotation prevention portion of the coil spring is formed by stretching a tip portion of the coil spring in a tangential direction of coil winding, and is engaged with an engaging rib at the fixed portion.

10. The optical pickup according to claim 1, wherein the torque biasing portion of the coil spring is formed by stretching a tip portion of the coil spring in an axial direction of the coil, and is engaged with an engaging concave portion at the movable portion.

11. The optical pickup according to claim 1, wherein the lens held by the movable portion is an aberration correction collimator lens.

12. The optical pickup according to claim 1, wherein the lens held by the movable portion is an aberration correction expand lens.

13. The optical pickup according to claim 1, wherein the teeth made of a material having a smaller friction coefficient than the engaging portion, to be engaged with the spiral grooves are fixed at a surface facing the feed screw at the engaging portion.

14. An optical pickup which is capable of correcting spherical aberration, comprising:
   an objective lens condensing light beams emitted from a light source to a recording surface of an information recording medium;
   an aberration correction lens correcting spherical aberration of laser light condensed to the recording surface by the objective lens;
   a movable portion in which the aberration correction lens is held;
   a fixed portion in which the movable portion is arranged so as to be slidable;
   a shaft arranged at the fixed portion in parallel to an optical axis of the light beams, supporting the movable portion so as to be rotatable about an axis of the shaft as well as to be slidable in a direction of the axis of the shaft;
   a feed screw arranged in parallel to an optical axis of the aberration correction lens, having spiral grooves;
   an engaging portion provided at the movable portion, having convex portions to be engaged with the spiral grooves of the feed screw from one direction; and
   a coil spring fitted to the outside of the shaft, pressing the movable portion in the direction of the axial of the shaft, and
   wherein one end portion of the coil spring includes a rotation prevention portion engaged with the fixed portion for preventing rotation,
   the other end portion of the coil spring includes a torque biasing portion engaged with the movable portion for biasing force rotating the engaging portion in the side of the feed screw about the shaft, and
   the coil spring is installed in a twisted state in advance, and
   the convex portions serve as teeth, on an occasion of failure, the teeth come off the spiral grooves of the feed screw, thereby preventing breakage.

15. The optical pickup according to claim 14, wherein the movable portion rotates about the shaft to thereby expose convex portions of the engaging portion engaged with the spiral grooves from the spiral grooves completely.

16. The optical pickup according to claim 15, wherein the rotation prevention portion of the coil spring is formed by stretching a tip portion of the coil spring in a tangential direction of coil winding, and is engaged with an engaging rib at the fixed portion.

17. The optical pickup according to claim 16, wherein the torque biasing portion of the coil spring is formed by stretching a tip portion of the coil spring in an axial direction of the coil, and is engaged with an engaging concave portion at the movable portion.

18. The optical pickup according to claim 17, wherein the lens held by the movable portion is an aberration correction collimator lens.

19. The optical pickup according to claim 18, wherein the teeth made of a material having a smaller friction coefficient than the engaging portion, to be engaged with the spiral grooves are fixed at a surface facing the feed screw at the engaging portion.

20. The optical pickup according to claim 17, wherein the lens held by the movable portion is an aberration correction expand lens.

21. The optical pickup according to claim 20, wherein the teeth made of a material having a smaller friction coefficient than the engaging portion, to be engaged with the spiral grooves are fixed at a surface facing the feed screw at the engaging portion.

22. The optical pickup according to claim 14, wherein the rotation prevention portion of the coil spring is formed by stretching a tip portion of the coil spring in a tangential direction of coil winding, and is engaged with an engaging rib at the fixed portion.

23. The optical pickup according to claim 14, wherein the torque biasing portion of the coil spring is formed by stretching a tip portion of the coil spring in an axial direction of the coil, and is engaged with an engaging concave portion at the movable portion.

24. The optical pickup according to claim 14, wherein the lens held by the movable portion is an aberration correction collimator lens.

25. The optical pickup according to claim 14, wherein the lens held by the movable portion is an aberration correction expand lens.

26. The optical pickup according to claim 14, wherein the teeth made of a material having a smaller friction coefficient than the engaging portion, to be engaged with the spiral grooves are fixed at a surface facing the feed screw at the engaging portion.

* * * * *